(12) United States Patent
Versini

(10) Patent No.: US 6,827,003 B2
(45) Date of Patent: Dec. 7, 2004

(54) PERCOLATOR UNIT WITH MOBILE INFUSION CHAMBER AND DETACHABLE WITHOUT USING TOOLS

(76) Inventor: Rolland Versini, 113 rue Edmond Rostand, F-13008 Marseille (FR)

( * ) Notice: Subject to any disclaimer, the term of this patent is extended or adjusted under 35 U.S.C. 154(b) by 100 days.

(21) Appl. No.: 10/333,909

(22) PCT Filed: Aug. 2, 2001

(86) PCT No.: PCT/FR01/02531
§ 371 (c)(1),
(2), (4) Date: Jan. 31, 2003

(87) PCT Pub. No.: WO02/09563
PCT Pub. Date: Feb. 7, 2002

(65) Prior Publication Data
US 2004/0011206 A1 Jan. 22, 2004

(30) Foreign Application Priority Data
Aug. 2, 2000  (FR) .......................................... 00 10220

(51) Int. Cl.⁷ .......................... A47J 31/00; A47J 31/24; A47J 31/34; A47J 31/36
(52) U.S. Cl. ......................... 99/287; 99/289 R; 99/295; 99/297; 99/302 P
(58) Field of Search ...................... 99/280, 287, 289 R, 99/293, 302 R, 302 P, 516, 536; 100/73, 131, 244, 264

(56) References Cited
U.S. PATENT DOCUMENTS

| | | | | |
|---|---|---|---|---|
| 3,760,712 A | * | 9/1973 | Rossi | 99/289 R |
| 4,852,472 A | * | 8/1989 | In-Albon et al. | 99/289 R |
| 5,094,156 A | * | 3/1992 | Noreille et al. | 99/516 |
| 5,230,277 A | * | 7/1993 | Bianco | 99/287 |
| 5,275,089 A | * | 1/1994 | Armellin | 99/289 R |
| 5,302,407 A | * | 4/1994 | Vetterli | 426/433 |
| 5,387,256 A | * | 2/1995 | Enomoto | 99/286 |
| 5,479,848 A | * | 1/1996 | Versini | 99/287 |
| 5,755,149 A | * | 5/1998 | Blanc et al. | 99/289 T |
| 6,557,683 B2 | * | 5/2003 | Geremia et al. | 192/53.5 |

FOREIGN PATENT DOCUMENTS

| | | |
|---|---|---|
| DE | 2006930 | 10/1970 |
| EP | 521861 | 1/1993 |
| EP | 634904 | 1/1995 |
| EP | 659377 | 6/1995 |
| EP | 931491 | 7/1999 |

* cited by examiner

Primary Examiner—Timothy F. Simone
(74) Attorney, Agent, or Firm—Greenblum & Bernstein, P.L.C.

(57) ABSTRACT

The invention concerns a percolator unit with mobile infusion chamber and detachable without using tools. It consists of a horizontal unit comprising three elements, a fixed part including a base, the powering component, the driving component and the injection piston (1); a movable slide bearing the coffee flow conduit and a locking front plate (9); a mobile part including an infusion chamber (2), a counter-plunger (3) and an articulated scraper (4, 18) whereof the movements are actuated by the movements of the infusion chamber generated by two tie rods (7) actuated by a screw (11) driven by a gear motor (12). The invention in designed for producing, in fully automatic conditions and without human intervention, a hot beverage such as expresso type coffee, that is delivered and dispensed to the consumer immediately after being percolated.

35 Claims, 3 Drawing Sheets

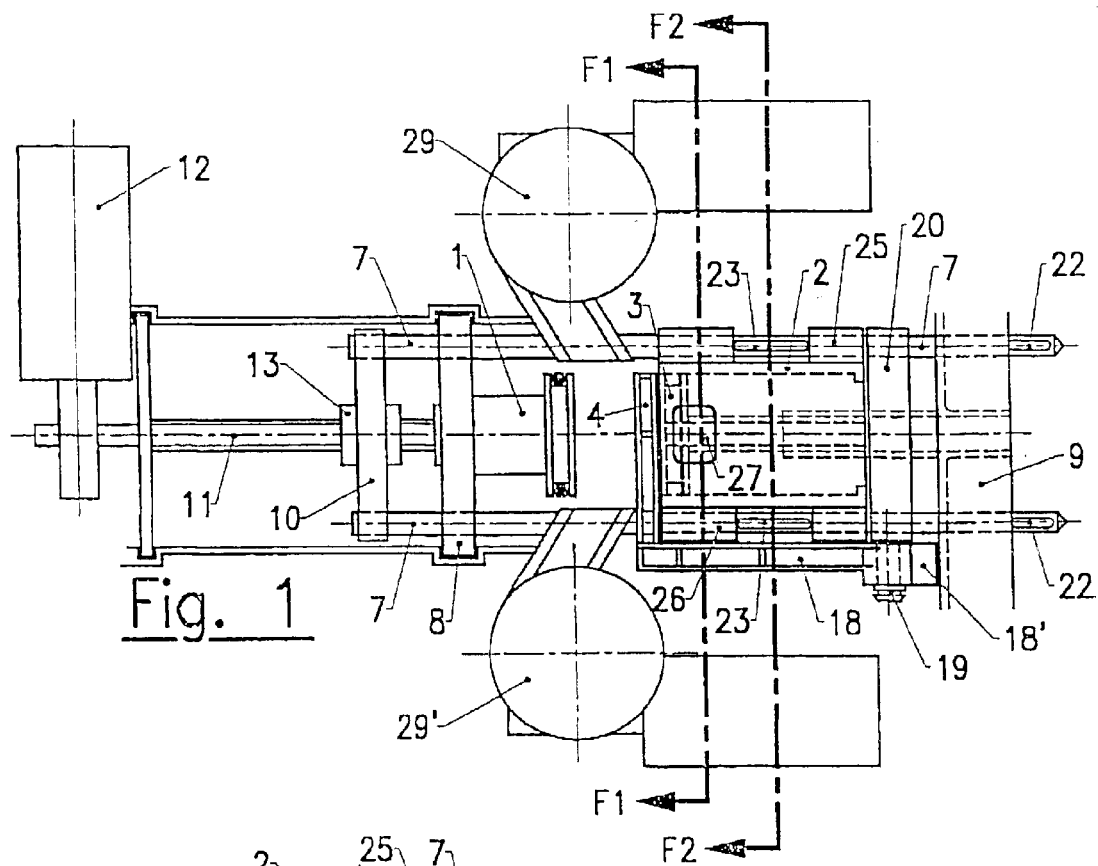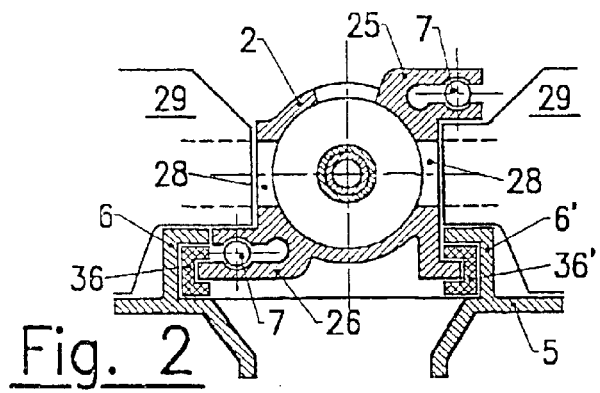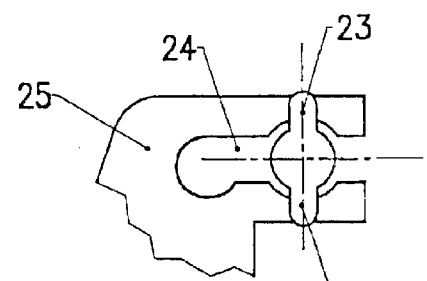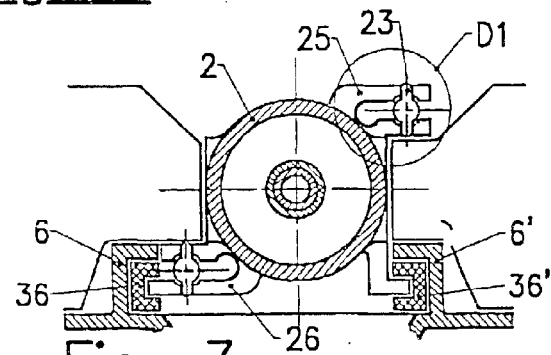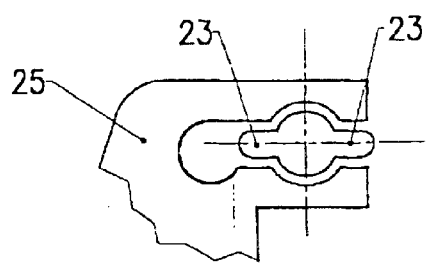

PERCOLATOR UNIT WITH MOBILE INFUSION CHAMBER AND DETACHABLE WITHOUT USING TOOLS

CROSS-REFERENCE TO RELATED APPLICATIONS

The present application is a National Phase application of PCT/FR01/02531 and claims priority under 35 U.S.C. § 119 of French Patent Application No. 00/10220, filed on Aug. 2, 2000.

BACKGROUND OF THE INVENTION

1. Field of the Invention

The present invention relates to a percolator unit with a movable infusion chamber which is detachable without using tools.

2. Discussion of Background Information

The percolator unit is adapted to make, under fully automatic conditions and without human intervention, a hot beverage, such as coffee of the expresso type, that is delivered and dispensed to the consumer immediately after being percolated.

The devices currently available are most often based on the use of a vertical cylinder constituting the infusion chamber in which a certain quantity of ground coffee is poured which is retained by a grid constituting the bottom of said cylinder. A piston that is displaced vertically first compresses the coffee powder, through which hot water is then injected and evacuated afterward.

The presence of the movable piston above the cylinder makes the operation of pouring the coffee powder difficult, imparting a complicated flow and requiring movable guiding means.

European Patent No. EP 0 521 861, filed by the same inventor, overcomes these drawbacks partially. The EP document describes a device equipped with a mechanical unit positioned horizontally in which the movements of the movable elements are all caused by two racks having inverted horizontal displacements driving a series of tie bars sliding on supports, the infusion chamber having a horizontal axis, in which the flow of hot water occurs vertically, being extended by a horizontal movable filling chamber in which the coffee powder is directly poured.

European Patent No. EP 0 634 904, also filed by the Applicant, describes a percolator constituted of a movable horizontal mechanical assembly equipped with an infusion chamber having a movable bottom extended by a filling chamber that is displaced simultaneously with the movable bottom, the main members of the assembly being made from functional sections, particularly a stationary rail, the infusion chamber as well as a movable part sliding on the stationary rail and carrying the compression piston, as well as a main rack driving a secondary rack by means of a stationary pinion, the filling chamber and the movable bottom also sliding on this stationary rail.

These devices are relatively complex given the presence of a filling chamber and the driving of the movable parts by several racks while remaining detachable.

SUMMARY OF THE INVENTION

The object of the device according to the instant invention is to overcome these drawbacks. Indeed, the invention allows obtaining an automatic machine for percolating under pressure comprising a small number of parts that are highly reliable and relatively easy to maintain, and especially having the advantage of being able to use two coffee grinders, therefore for two different coffees, regular and decaffeinated, for example, or two types of different coffees.

The invention comprises a horizontally arranged mechanical unit comprising three elements:
- a stationary part including a base, the powering component, the driving component and the injection piston,
- a removable slide bearing the coffee flow conduit and, additionally,
- a movable part including an infusion chamber, a counter-plunger and an articulated scraper whose movements are actuated by the displacements of the infusion chamber generated by two tie rods actuated by a screw driven by a gear motor.

According to the invention, a percolator comprises a movable infusion chamber adapted to make, under fully automatic conditions, a hot beverage through cycle phases including filling, compression, infusion, extraction and sweeping of the grounds. A mechanical unit is arranged horizontally in the percolator, the mechanical unit comprising a fixed part including a base provided with two primary rails, a powering component, a driving component and an injection piston, and a movable part including an infusion chamber, a counter-plunger and an articulated scraper assembly. The movements of the counter-plunger and of the scraper assembly is actuated by the displacements of the infusion chamber resulting from sliding of two tie-rods in borings provided in a vertical piston bearing plate that is affixed to the base. One end of each tie-rod is secured to a movable plate being displaced on the primary rails and actuated by a driving system adapted to move the infusion chamber in both directions along two horizontal secondary rails affixed to a movable slide bearing a front plate and a hot beverage flow conduit, the secondary rails sliding in the two primary rails of the base.

According to another aspect of the invention, the movable infusion chamber may be detachable without using tools. The driving system may comprise a screw that is parallel to the axis of the infusion chamber, driven by a gear motor and rotating in a nut affixed to the movable plate. The driving of the screw by the gear motor may occur by way of a rapid coupling, the driving nut mounted on the movable plate comprising a pressure box, the stopping and reversing of the movement being controlled directly by an electronic torque sensor controlling the pressure so as to eliminate microswitches normally used.

According to yet another aspect of the invention, the driving system may comprise a double action cylinder actuated by way of pressurized water originating from the pump that also furnishes the water adapted for infusing the hot beverage. Controlling the position of the cylinder, as well as the quantity of water to be infused, may occur due to a single flow meter associated with a programmable system actuating electrovalves. The counter-plunger may be driven by an annular shoulder arranged at the bottom of the infusion chamber and acting on one of the head and two abutments affixed to the counter-plunger. The counter-plunger may comprise two flexible tongues butting against an annular boss affixed to the flow conduit so as to restrict its movement at the beginning of the extraction phase. The hot beverage may comprise coffee. The coffee grounds may be placed in the percolator, wherein for the infusion phase, hot water enters through the stationary piston and traverses the coffee grounds, and wherein the beverage thus obtained leaves through an orifice of the counter-plunger extended rearwardly by a tube sliding in the flow conduit to leave the percolator.

Moreover, according to the invention, the scraper assembly may be borne by a lateral arm rotating about a horizontal pivot perpendicular to the longitudinal axis of the percolator and mounted on a movable part sliding on the secondary rails and maintained in a resting position by a spring and an abutment, the arm comprising a device provided to tilt the arm downwardly by butting against the front plate, one of a return abutment and rack forcing the device to resume its original position during the return.

According to the invention, the front surface of the counter-plunger may be cambered along the path followed by the scraper assembly during removal of the coffee grounds, so as to improve the efficiency of the sweeping. The infusion chamber, the counter-plunger and the movable part of the scraper assembly are driven by the tie-rods due to one of ribs or fins thereof located on the sides of the infusion chamber, the tie rods being pivotable one quarter turn so as to allow one of locking and release of the assembly. The bodies of the infusion chamber and of the movable part of the scraper assembly may include passages whose form allows them to slide on the one of ribs or fins when the tie rods are in the unlocked position. The scraper assembly may comprise a cam.

According to another aspect of the invention, the front plate may comprise holes allowing the passage of the tie rods, regardless of their position. After the sweeping phase, the tie rods may extend beyond the front of the front plate to allow the user to pivot them one quarter turn due to the one of ribs or fins to obtain the unlocking in order to extract the assembly for cleaning and maintenance. The infusion chamber may comprise, for each tie rod, double supports bearing the passages and arranged on each side of one of the ribs and fins such that the infusion chamber is driven in both directions by the movements of the tie rods. The filling the infusion chamber may be done from the top due to an upper opening.

According to yet another aspect of the invention, filling the infusion chamber may be done on the sides, through lateral openings allowing use of two grinders that are individually controllable and to output on request two distinct hot beverages.

BRIEF DESCRIPTION OF THE DRAWINGS

In the attached drawings that are given by way of non-limiting example of one of the embodiments of the object of the invention:

FIG. 1 shows the mechanical unit seen from the top,

FIG. 2 is an enlarged transverse cross-section along the arrows F1 of the preceding Figure, FIG. 3 is an enlarged partial transverse cross-section along the arrows F2 of FIG. 1, FIGS. 4 and 5 are enlargements of the detail D1 of FIG. 3 showing the locking system in the locked and unlocked position, respectively.

DETAILED DESCRIPTION OF THE PRESENT INVENTION

Figure 6:
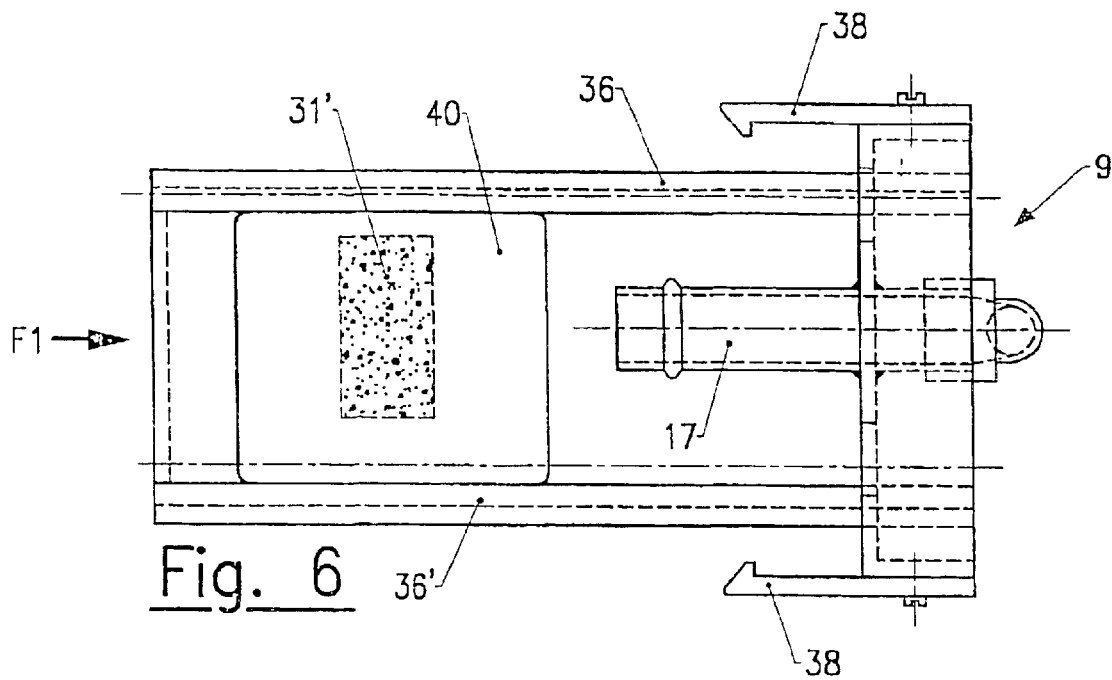
FIG. 6 is an enlarged representation of the removable slide.
Figure 7:
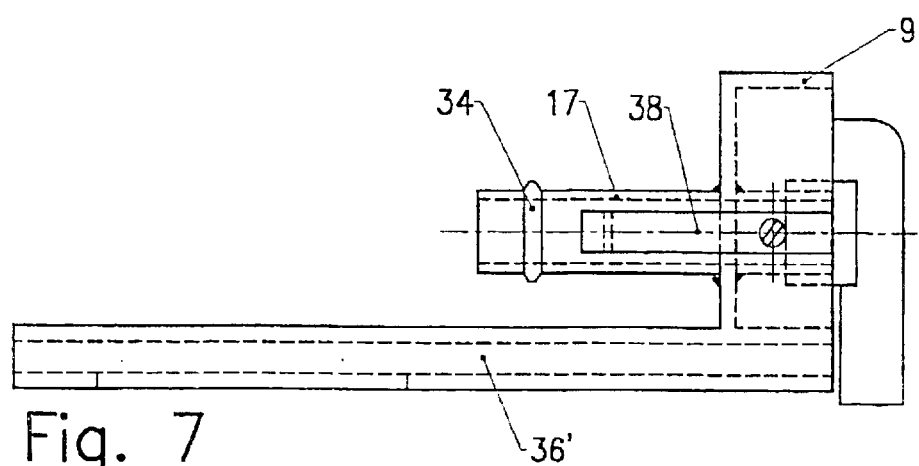
FIG. 7 shows under the same condition the slide seen from the side.
Figure 8:
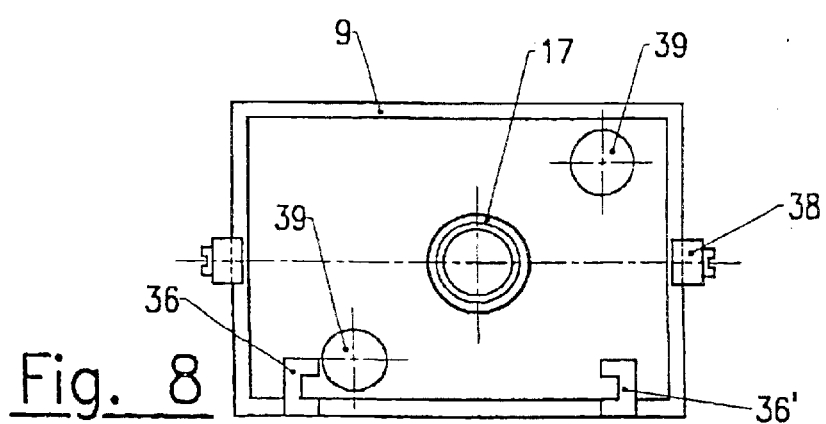
FIG. 8 shows the slide seen from the end, along the arrow F1 of FIG. 6.

The percolator unit, shown in FIGS. 1–13, is primarily constituted of a stationary piston 1, a movable infusion chamber 2, an extraction counter-plunger 3 that is also movable and located within the infusion chamber, and an articulated scraper 4 allowing the removal of the grounds.

The assembly is mounted on a base 5 comprising two horizontal rails 6, 6' along which a movable plate 10 actuated by the driving system is displaced at the rear stationary portion. At the front portion, the same rails 6, 6' receive two secondary rails 36, 36' affixed to a removable slide comprising a locking front plate 9 and a coffee flow conduit 17. The infusion chamber 2 and a scraping assembly are displaced on the secondary rails.

The movement of the infusion chamber 2 is ensured due to two tie rods 7 sliding in bores provided to this end in a vertical piston bearing plate 8 affixed to the base 5. One of the ends of each of the tie rods 7 is fixed to the movable plate 10 that can be displaced in both directions due to a screw 11 parallel to the axis of the infusion chamber, driven by a gear motor 12 and rotating in a nut 13 affixed to the movable plate.

The counter-plunger 3, provided with a screen 37 on its front portion, driven during the compression phase by an annular shoulder 14 arranged at the bottom of the infusion chamber 2, is traversed by an orifice 15 extended rearwardly by a tube 16 sliding in the flow conduit 17 affixed to the removable locking plate 9.

The scraping assembly is formed of a scraper 4 borne by a lateral arm 18 rotating about a horizontal pivot 19 perpendicular to the longitudinal axis of the percolator and mounted on a movable part 20 that is maintained in a resting position by a spring 21 and an abutment 38, this movable part sliding on the secondary rails 36, 36' and being traversed by the tie rods 7. The arm 18 comprises a device, such as a cam 18', provided to tilt the arm downwardly by butting against the removable plate 9 when the movable part is pushed against the latter by the infusion chamber 2 at the end of the extraction phase, a return abutment or a rack forcing the device to reassume its original position during the return.

The movable parts, the infusion chamber 2, the counter-plunger 3 and the scraper assembly are engaged on the tie rods 7 due to ribs or fins 23 thereof located on both sides of the infusion chamber 2. The tie rods can pivot one quarter turn so as to allow the locking or the release of the assembly. To this end, the bodies of the infusion chamber and of the movable part 20 of the scraper assembly comprise passages 24 whose form allows them to slide on the ribs or fins when the tie rods are in the unlocked position. For each tie rod, the infusion chamber comprises double supports 25, 26 bearing these passages, arranged on each side of the ribs or fins 23 such that the infusion chamber is driven in both directions by the movements of the movable plate 10 and the tie rods 7. The front plate 9 comprises holes 39 allowing the passage of the tie rods, regardless of their position. After the sweeping phase, these tie rods extend beyond the front of the front plate to allow the user to pivot them one quarter turn due to the maneuvering ribs or fins 22 to unlock and remove the assembly for cleaning and maintenance.

This arrangement allows dismounting the soiled portion from the apparatus very easily and to extract the slide bearing the front plate 9, the flow conduit 17 and the secondary rails 36, 36', as well as the infusion chamber 2, the counter-plunger 3 and the scraper assembly 4, 18 mounted on this slide, which completely clears away the stationary piston 1. Maintenance is thus greatly facilitated and can be done without difficulty by non-specialized personnel.

Filling the infusion chamber can be done from the top due to an upper opening 27. For grinding purposes, it will preferably be done on the sides, through lateral openings 28 allowing to use two grinders 29, 29' that can be controlled individually and output on request two distinct products, for example, regular coffee and decaffeinated coffee, or two different coffees that are very complementary in order to obtain a good expresso.

Figure 9:
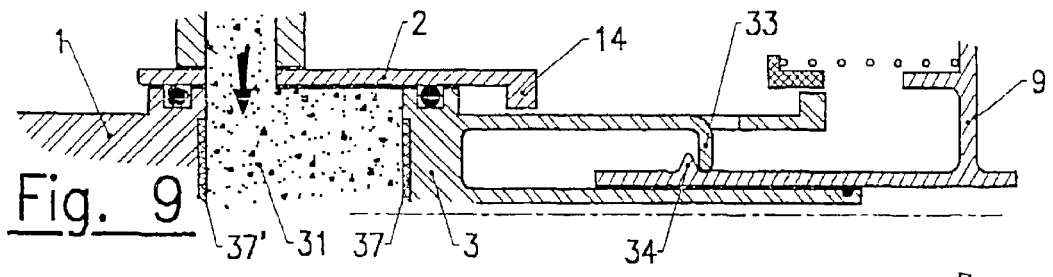
FIG. 9 is a partial axial cross-section showing the infusion chamber during the loading phase.

The apparatus functions on a cycle comprising the following phases:

Filling: the infusion chamber 2 is positioned such that the opening(s) 27, 28 are facing the outlet of the grinders 29, 29', the counter-plunger 3 being at the bottom of the infusion chamber (FIG. 9).

Figure 10:
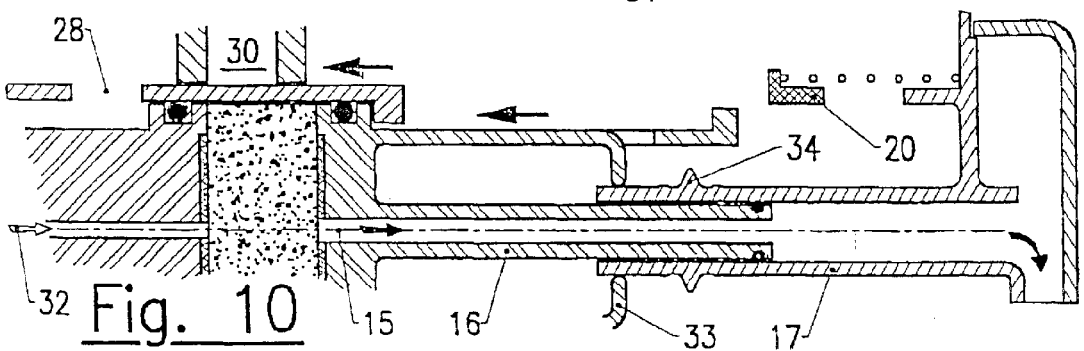
FIG. 10 shows under the same conditions the position of the movable parts during the infusion phase.

Compression: the infusion chamber is displaced by the tie rods 7 toward the stationary piston 1 by driving the counter-plunger 3 due to the annular shoulder 14, which has the effect of blocking the outlets 30 of the grinders 29, 29' and of compressing the grains 31 (FIG. 10).

Infusion: hot water 32 enters through the stationary piston 1, traverses a grid 37' mounted on the surface of this piston, and the grains 31. The beverage thus obtained exits through the counter-plunger 3 and enters the flow conduit 17 to leave the apparatus (FIG. 10).

Figure 11:
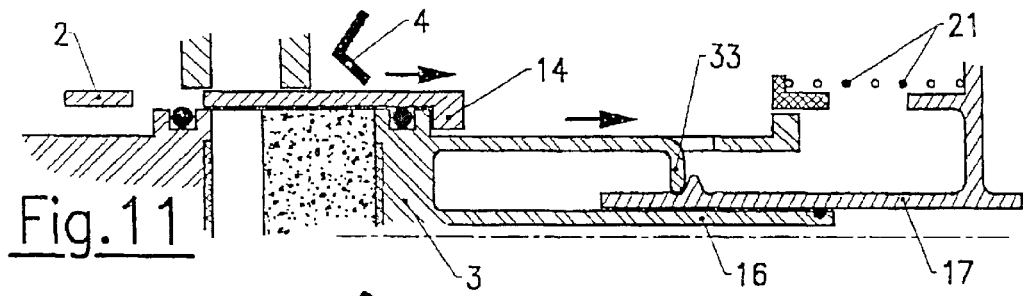
FIGS. 11 and 12 show two successive stages of the extraction phase, respectively.
Figure 12:
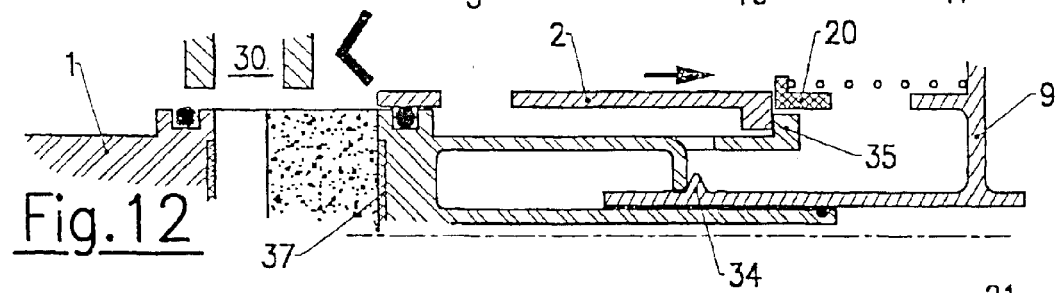

Extraction: the infusion chamber 2 is moved in reverse by driving the counter-plunger 3 through friction. The latter comprises two flexible tongues 33 butting against an annular boss 34 affixed to the flow conduit 17, which at first restricts its movement (FIG. 11). The infusion chamber continues its movement until its annular shoulder 14 meets two abutments 35 affixed to the counter-plunger 3 and the movable part 20 of the scraping mechanism simultaneously (FIG. 12).

Figure 13:
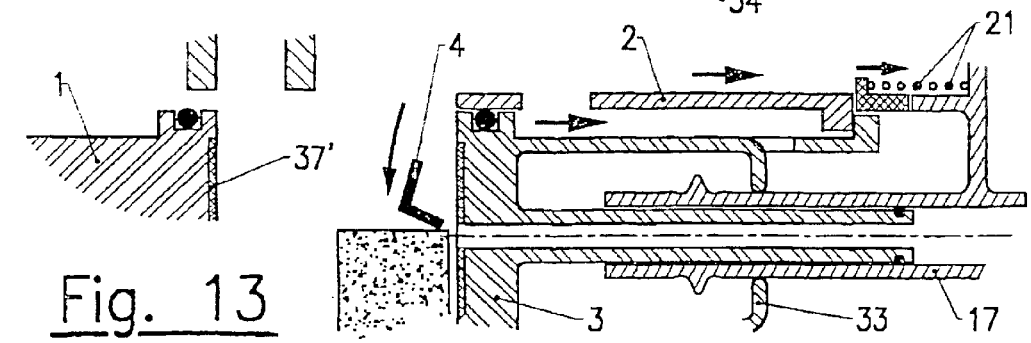
FIG. 13 shows the action of the scraping device during the sweeping phase.

Sweeping: by continuing its movement, the infusion chamber 2 drives the counter-plunger 3 and the movable part 20, which has the effect of passing the scraper 4 over the front surface of the counter-plunger and of ensuring the removal of the grounds 31' through an opening 40 provided to this end on the base 5 (FIGS. 6, 13). When the infusion chamber moves in reverse for a new cycle, the scraper 4 returns to its raised position due to a return spring, and the counter-plunger is driven by friction of the joint until the two tongues 33 meet the annular boss 34.

The front surface of the counter-plunger 3 and the grid 37 can advantageously be cambered along the path followed by the scraper 4 during the removal of the grounds 31', so as to improve the efficiency of the sweeping.

The driving of the screw 11 by the geared motor 12 preferably occurs by way of a rapid coupling, the driving nut 13 mounted on the movable plate 10 being capable of comprising a pressure box, the stopping and reversing of the movement being controlled directly by an electronic torque sensor controlling the pressure, which allows eliminating the micro-switches that are normally used.

According to an alternative embodiment, the driving unit is composed of a double action cylinder actuated by way of pressurized water originating from the pump that also furnishes the water adapted for infusing the coffee. In this case, controlling the position of the cylinder, as well as the quantity of water to be infused, can advantageously occur due to a single flow meter associated with a programmable system actuating the electrovalves.

The positioning of the various components gives the object of the invention a maximum of useful effects that, until now, had not been obtained by similar devices.

What is claimed is:

1. Percolator unit with a movable infusion chamber and detachable without using tools, adapted to make, under fully automatic conditions, a hot beverage, due to a cycle including phases of filling, compression, infusion, extraction and sweeping of the grounds, wherein a combination of a mechanical unit is arranged horizontally, comprising, on the one hand, a stationary part including a base provided with two rails, a powering component, a driving component, and an injection piston, and, on the other hand, a movable part including an infusion chamber, a counter-plunger and an articulated scraper assembly, the movements of the counter-plunger and of the scraper being actuated by the displacements of said infusion chamber ensured due to two tie-rods sliding in borings provided to this end in a vertical piston bearing plate that is affixed to the base, one of the ends of each tie-rod being fixed to a movable plate being displaced on the rails and actuated by a driving system capable of moving the infusion chamber in both directions along two horizontal secondary rails affixed to a movable slide bearing a front plate and the hot beverage flow conduit, said secondary rails sliding in the two rails of the base.

2. Percolator unit according to claim 1, wherein the driving system comprises a screw that is parallel to the axis of the infusion chamber, driven by a gear motor and rotating in a nut affixed to the movable plate.

3. Percolator unit according to claim 2, wherein the driving of the screw by the gear motor occurs by way of a rapid coupling, the driving nut mounted on the movable plate comprising a pressure box, the stopping and reversing of the movement being controlled directly by an electronic torque sensor controlling the pressure so as to eliminate micro-switches normally used.

4. Percolator unit according to claim 1, wherein the driving system comprises a double action cylinder actuated by way of pressurized water originating from the pump that also furnishes the water adapted for infusing the hot beverage, and that controlling the position of the cylinder, as well as the quantity of water to be infused, occurs due to a single flow meter associated with a programmable system actuating electrovalves.

5. Percolator unit according to claim 1, wherein the counter-plunger is driven by an annular shoulder arranged at the bottom of the infusion chamber and acting either on one of the head and two abutments affixed to said counter-plunger.

6. Percolator unit according to claim 5, wherein the counter-plunger comprises two flexible tongues butting against an annular boss affixed to the flow conduit so as to restrict its movement at the beginning of the extraction phase.

7. Percolator unit according to claim 1, wherein, for the infusion phase, hot water enters through the stationary piston and traverses the grounds, the beverage thus obtained leaves through an orifice of the counter-plunger extended rearwardly by a tube sliding in the flow conduit to leave the percolator.

8. Percolator unit according to claim 1, wherein the scraper assembly is borne by a lateral arm rotating about a horizontal pivot perpendicular to the longitudinal axis of the percolator and mounted on a movable part sliding on the secondary rails and maintained in a resting position by a spring and an abutment, the arm comprising a device, provided to tilt said arm downwardly by butting against the front plate, one of a return abutment and rack forcing the device to resume its original position during the return.

9. Percolator unit according to claim 8, wherein the front surface of the counter-plunger is cambered along the path followed by the scraper assembly during the removal of the grounds, so as to improve the efficiency of the sweeping.

10. Percolating unit according to claim 8, wherein the infusion chamber, the counter-plunger and the movable part of the scraping assembly are driven by the tie-rods due to ribs or fins thereof located on the sides of the infusion chamber, the tie rods being pivotable one quarter turn so as to allow one of locking and release of the assembly; to this end, the bodies of the infusion chamber and of the movable part of the scraper assembly comprise passages whose form allows them to slide on the ribs or fins when the tie rods are in the unlocked position.

11. Percolator unit according to claim 10, wherein the front plate comprises holes allowing the passage of the tie rods, regardless of their position; after the sweeping phase, said tie rods extend beyond the front of the front plate to allow the user to pivot them one quarter turn due to the maneuvering ribs or fins to obtain the unlocking in order to extract the assembly for cleaning and maintenance.

12. Percolator unit according to claim 10, wherein the infusion chamber comprises, for each tie rod, double supports bearing the passages and arranged on each side of the ribs or fins such that the infusion chamber is driven in both directions by the movements of the tie rods.

13. Percolator unit according to claim 1, wherein filling the infusion chamber is done from the top due to an upper opening.

14. Percolator unit according to claim 1, wherein filling the infusion chamber is done on the sides, through lateral openings allowing to use two grinders that can be controlled individually and to output on request two distinct hot beverages.

15. Percolator unit according to claim 1, wherein the hot beverage comprises coffee.

16. Percolator unit according to claim 1 wherein the coffee is of the espresso type.

17. Percolator unit according to claim 8, wherein the device comprises a cam.

18. Percolator unit according to claim 14, wherein the two distinct hot beverages comprise at least one of regular coffee and decaffeinated coffee, or two complementary coffees at the user's request.

19. A percolator comprising:
a movable infusion chamber adapted to make, under fully automatic conditions, a hot beverage through cycle phases including filling, compression, infusion, extraction and sweeping of the grounds, wherein a mechanical unit is arranged horizontally, said mechanical unit comprising:
a fixed part including:
a base provided with two primary rails;
a powering component;
a driving component; and
an injection piston, and,
a movable part including:
an infusion chamber;
a counter-plunger; and
an articulated scraper assembly;
the movements of the counter-plunger and of the scraper assembly being actuated by the displacements of said infusion chamber resulting from sliding of two tie-rods in borings provided in a vertical piston bearing plate that is affixed to the base, one end of each tie-rod being secured to a movable plate being displaced on the primary rails and actuated by a driving system adapted to move the infusion chamber in both directions along two horizontal secondary rails affixed to a movable slide bearing a front plate and a hot beverage flow conduit, said secondary rails sliding in the two primary rails of the base.

20. The percolator according to claim 19, wherein said movable infusion chamber is detachable without using tools.

21. The percolator according to claim 19, wherein the driving system comprises a screw that is parallel to the axis of the infusion chamber, driven by a gear motor and rotating in a nut affixed to the movable plate.

22. The percolator according to claim 21, wherein the driving of the screw by the gear motor occurs by way of a rapid coupling, the driving nut mounted on the movable plate comprising a pressure box, the stopping and reversing of the movement being controlled directly by an electronic torque sensor controlling the pressure so as to eliminate micro-switches normally used.

23. The percolator according to claim 19, wherein the driving system comprises a double action cylinder actuated by way of pressurized water originating from the pump that also furnishes the water adapted for infusing the hot beverage, and that controlling the position of the cylinder, as well as the quantity of water to be infused, occurs due to a single flow meter associated with a programmable system actuating electrovalves.

24. The percolator according to claim 19, wherein the counter-plunger is driven by an annular shoulder arranged at the bottom of the infusion chamber and acting on one of the head and two abutments affixed to said counter-plunger.

25. The percolator according to claim 23, wherein the counter-plunger comprises two flexible tongues butting against an annular boss affixed to the flow conduit so as to restrict its movement at the beginning of the extraction phase.

26. The percolator according to claim 19, wherein the hot beverage comprises coffee.

27. The percolator according to claim 26, further comprising coffee grounds placed in the percolator, wherein for the infusion phase, hot water enters through the stationary piston and traverses the coffee grounds, and wherein the beverage thus obtained leaves through an orifice of the counter-plunger extended rearwardly by a tube sliding in the flow conduit to leave the percolator.

28. The percolator according to claim 19, wherein the scraper assembly is borne by a lateral arm rotating about a horizontal pivot perpendicular to the longitudinal axis of the percolator and mounted on a movable part sliding on the secondary rails and maintained in a resting position by a spring and an abutment, the arm comprising a device provided to tilt said arm downwardly by butting against the front plate, one of a return abutment and rack forcing the device to resume its original position during the return.

29. The percolator according to claim 27, wherein the front surface of the counter-plunger is cambered along the path followed by the scraper assembly during removal of the coffee grounds, so as to improve the efficiency of the sweeping.

30. The percolator according to claim 26, wherein the infusion chamber, the counter-plunger and the movable part of the scraper assembly are driven by the tie-rods due to one of ribs or fins thereof located on the sides of the infusion chamber, the tie rods being pivotable one quarter turn so as to allow one of locking and release of the assembly, the bodies of the infusion chamber and of the movable part of the scraper assembly including passages whose form allows them to slide on the one of ribs or fins when the tie rods are in the unlocked position.

31. The percolator according to claim 28, wherein the front plate comprises holes allowing the passage of the tie rods, regardless of their position; after the sweeping phase, said tie rods extend beyond the front of the front plate to allow the user to pivot them one quarter turn due to the one of ribs or fins to obtain the unlocking in order to extract the assembly for cleaning and maintenance.

32. The percolator according to claim 28, wherein the infusion chamber comprises, for each tie rod, double supports bearing the passages and arranged on each side of one of the ribs and fins such that the infusion chamber is driven in both directions by the movements of the tie rods.

33. The percolator according to claim 19, wherein filling the infusion chamber is done from the top due to an upper opening.

34. The percolator according to claim 19, wherein filling the infusion chamber is done on the sides, through lateral openings allowing use of two grinders that are individually controllable and to output on request two distinct hot beverages.

35. The percolator according to claim 26, wherein the scraper assembly comprises a cam.

* * * * *